(12) United States Patent
Masuda et al.

(10) Patent No.: US 10,712,725 B2
(45) Date of Patent: Jul. 14, 2020

(54) NON-TRANSITORY COMPUTER-READABLE STORAGE MEDIUM, ROBOT TRANSFER TIME ESTIMATION METHOD, AND ROBOT TRANSFER TIME ESTIMATION DEVICE

(71) Applicant: FUJITSU LIMITED, Kawasaki-shi, Kanagawa (JP)

(72) Inventors: Yasuyuki Masuda, Kawasaki (JP); Yukio Ozaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 365 days.

(21) Appl. No.: 15/903,079

(22) Filed: Feb. 23, 2018

(65) Prior Publication Data
US 2018/0299858 A1 Oct. 18, 2018

(30) Foreign Application Priority Data

Apr. 18, 2017 (JP) .................................. 2017-082151

(51) Int. Cl.
*G05B 19/401* (2006.01)
*G05B 19/418* (2006.01)
(Continued)

(52) U.S. Cl.
CPC .......... *G05B 19/401* (2013.01); *B25J 9/1671* (2013.01); *G05B 15/02* (2013.01);
(Continued)

(58) Field of Classification Search
CPC ............ G05B 19/401; G05B 19/41815; G05B 19/41865; G05B 2219/39358;
(Continued)

(56) References Cited

U.S. PATENT DOCUMENTS 6,629,053 B1 * 9/2003 Mooring ............... G05B 19/401
702/149
7,269,479 B2 * 9/2007 Okamoto ................. B25J 5/007
318/568.12

(Continued)

FOREIGN PATENT DOCUMENTS

| JP | 60-061801 | 4/1985 |
| JP | 10-143218 | 5/1998 |
| JP | 2015-182173 | 10/2015 |

OTHER PUBLICATIONS

Al-Dois et al., GA-based control of a robot manipulator in a foundry workcell, 2014, IEEE, p. 1-8 (Year: 2014).*

(Continued)

*Primary Examiner* — McDieunel Marc
(74) *Attorney, Agent, or Firm* — Fujitsu Patent Center

(57) ABSTRACT

Provided is a non-transitory computer-readable storage medium storing a program for causing a computer to execute a process, the process including: acquiring transfer times of straight transfer paths for a hand of a vertical articulated robot having at least four controlled axes; calculating a vector of each of the straight transfer paths; comparing a direction of a vector of a target path for which a transfer time is to be estimated with a direction of the vector of each of the straight transfer paths, and identifying, among the straight transfer paths, a transfer path most similar in vector direction to the target path; and estimating a transfer time of the target path, in accordance with a scalar quantity of a vector of an identified transfer path, a scalar quantity of the vector of the target path, and a transfer time of the identified transfer path.

7 Claims, 15 Drawing Sheets

(51) Int. Cl.
 *G05B 15/02* (2006.01)
 *B25J 9/16* (2006.01)
(52) U.S. Cl.
 CPC .. *G05B 19/41815* (2013.01); *G05B 19/41865* (2013.01); *G05B 2219/39358* (2013.01); *Y02P 90/02* (2015.11)
(58) Field of Classification Search
 CPC ...... G05B 15/02; G05B 19/237; B25J 9/1671; B25J 5/007; B25J 9/1666; B25J 9/1692; B25J 9/1605; B25J 9/20; B25J 9/1697; G05D 1/0274; H01L 21/67276; G06K 9/20
 See application file for complete search history.

(56) References Cited

U.S. PATENT DOCUMENTS

| | | | | |
|---|---|---|---|---|
| 7,313,464 | B1* | 12/2007 | Perreault | B25J 9/1666 318/568.1 |
| 7,333,879 | B2* | 2/2008 | Takizawa | B25J 9/1671 219/121.63 |
| 7,424,342 | B2* | 9/2008 | Beniyama | B25J 5/007 318/568.1 |
| 8,195,331 | B2* | 6/2012 | Myeong | G05D 1/0274 134/18 |
| 2008/0147238 | A1* | 6/2008 | Joly | G05B 19/237 700/260 |
| 2015/0268659 | A1 | 9/2015 | Nishi | |
| 2017/0326727 | A1* | 11/2017 | Kimura | B25J 9/1605 |
| 2019/0283246 | A1* | 9/2019 | Enomoto | B25J 9/1692 |

OTHER PUBLICATIONS

Wang et al., A new architecture for robot control, 1987, IEEE, p. 664-670 (Year: 1987).*
Korein et al., Robotics, 1987, IEEE, p. 55-98 (Year: 1987).*
Wang et al., The 3DP: a processor architecture for three-dimensional applications, 1992, IEEE, p. 25-36 (Year: 1992).*

* cited by examiner

FIG. 6A

<COORDINATE DB 50>

| PART SUPPLY POSITION | COORDINATES |
|---|---|
| F1 | X1, Y1, Z1 |
| F2 | X2, Y2, Z2 |
| F3 | X3, Y3, Z3 |
| F4 | X4, Y4, Z4 |
| F5 | X5, Y5, Z5 |
| F6 | X6, Y6, Z6 |

| ASSEMBLING POSITION | COORDINATES |
|---|---|
| P1 | Xp1, Yp1, Zp1 |
| P2 | Xp2, Yp2, Zp2 |
| P3 | Xp3, Yp3, Zp3 |
| P4 | Xp4, Yp4, Zp4 |
| P5 | Xp5, Yp5, Zp5 |
| P6 | Xp6, Yp6, Zp6 |
| P7 | Xp7, Yp7, Zp7 |
| P8 | Xp8, Yp8, Zp8 |
| P9 | Xp9, Yp9, Zp9 |

FIG. 6B

<TASK DB 52>

| TASK ID | PART SUPPLY POSITION COORDINATES | ASSEMBLING POSITION COORDINATES | TRANSFER TIME |
|---|---|---|---|
| P1 | F1 (X1, Y1, Z1) | P1 (Xp1, Yp1, Zp1) | T1 |
| P2 | F2 (X2, Y2, Z2) | P2 (Xp2, Yp2, Zp2) | T2 |
| P3 | F3 (X3, Y3, Z3) | P3 (Xp3, Yp3, Zp3) | T3 |
| P4 | F4 (X4, Y4, Z4) | P4 (Xp4, Yp4, Zp4) | T4 |
| P5 | F5 (X5, Y5, Z5) | P5 (Xp5, Yp5, Zp5) | T5 |
| P6 | F6 (X6, Y6, Z6) | P6 (Xp6, Yp6, Zp6) | T6 |

FIG. 6C

<OPERATION VECTOR DB 54>

| TASK ID | OPERATION VECTOR |
|---|---|
| P1 | F1P1 |
| P2 | F2P2 |
| P3 | F3P3 |
| P4 | F4P4 |
| P5 | F5P5 |
| P6 | F6P6 |

FIG. 9A
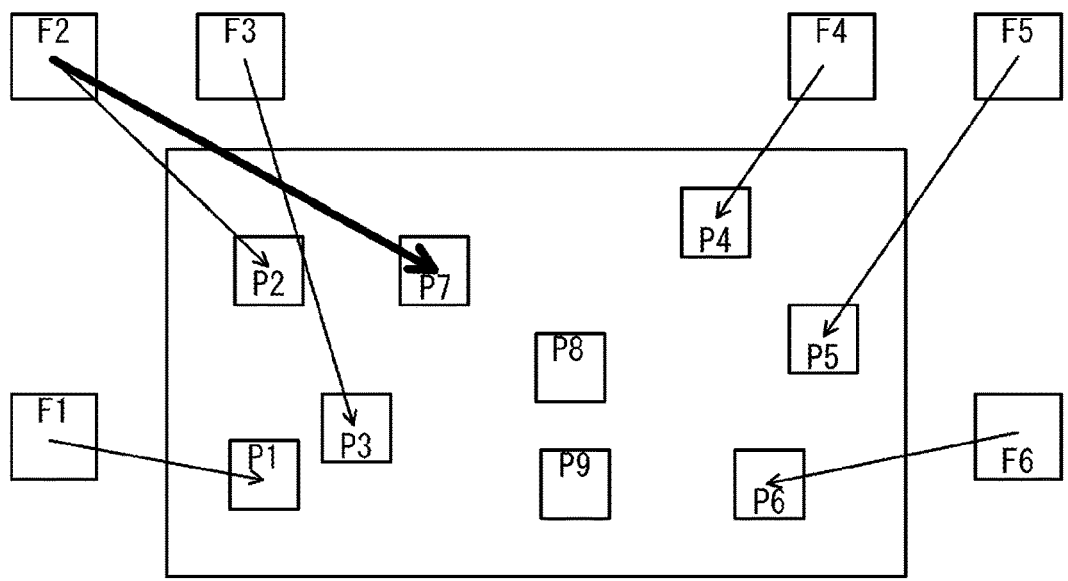
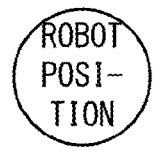
FIG. 9B
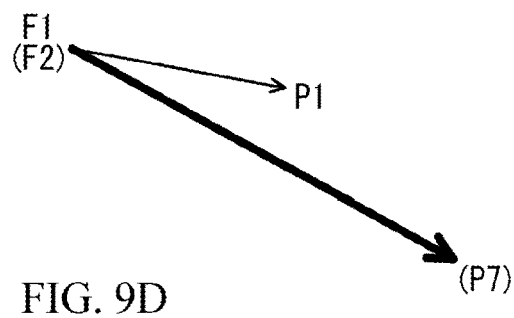
FIG. 9C
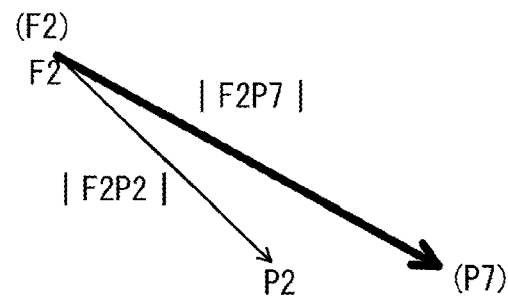
FIG. 9D
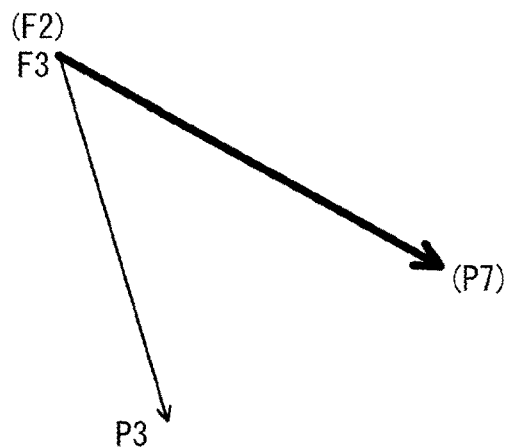

FIG. 11

<TRANSFER TIME DB 56>

| TASK ID | PART SUPPLY POSI-TION COORDINATES | ASSEMBLING POSI-TION COORDINATES | TRANSFER TIME |
|---|---|---|---|
| P7 | F1 (X1, Y1, Z1) | P7 (Xp7, Yp7, Zp7) | K1 × T1 |
| P7 | F2 (X2, Y2, Z2) | P7 (Xp7, Yp7, Zp7) | K2 × T2 |
| P7 | F3 (X3, Y3, Z3) | P7 (Xp7, Yp7, Zp7) | K3 × T2 |
| ... | ... | ... | ... |
| P8 | F1 (X1, Y1, Z1) | P8 (Xp8, Yp8, Zp8) | K11 × T1 |
| ... | ... | ... | ... |

NON-TRANSITORY COMPUTER-READABLE STORAGE MEDIUM, ROBOT TRANSFER TIME ESTIMATION METHOD, AND ROBOT TRANSFER TIME ESTIMATION DEVICE

CROSS-REFERENCE TO RELATED APPLICATION

This application is based upon and claims the benefit of priority of the prior Japanese Patent Application No. 2017-082151 filed on Apr. 18, 2017, the entire contents of which are incorporated herein by reference.

FIELD

A certain aspect of the embodiments described herein relates to a non-transitory computer-readable storage medium, a robot transfer time estimation method, and a robot transfer time estimation device.

BACKGROUND

Conventional process orchestration (also called a process plan) for assigning tasks to the respective processes (task units) on an assembly line for assembling products is optimized by taking into account compliance with the task order in each process and levelling of workloads. In a case where a robot is included in the assembly line, the time required for each task needs to be estimated, to calculate the cycle time (the time required for one task cycle) of the robot. The time required for each task is a total of the time required till a part is picked up at the part supply position, the time required till the picked-up part is conveyed to the assembling position (the transfer time for the robot), and the time required for incorporating the part into the product.

SUMMARY

According to an aspect of the embodiments, there is provided a non-transitory computer-readable storage medium storing a robot transfer time estimation program for causing a computer to execute a process, the process including: acquiring transfer times of a plurality of straight transfer paths for a hand of a vertical articulated robot having at least four controlled axes; calculating a vector of each of the plurality of straight transfer paths; comparing a direction of a vector of a target path for which a transfer time is to be estimated with a direction of the vector of each of the plurality of straight transfer paths, and identifying, among the plurality of straight transfer paths, a transfer path most similar in vector direction to the target path; and estimating a transfer time of the target path, in accordance with a scalar quantity of a vector of an identified transfer path, a scalar quantity of the vector of the target path, and a transfer time of the identified transfer path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A is a diagram illustrating an example data structure of a coordinate DB, FIG. 6B is a diagram illustrating an example data structure of a task DB, and FIG. 6C is a diagram illustrating an example data structure of an operation vector DB;

FIG. 9A through FIG. 9D are diagrams for describing transfer time estimation (example 2);

FIG. 11 is a diagram illustrating an example data structure of a transfer time DB;

DESCRIPTION OF EMBODIMENTS

In a case where the transfer time for a robot in a new task is estimated, it is possible to take into account the transfer times in other tasks calculated or measured through a simulation or the like, and differences in transfer distance between the other tasks and the new task. However, in a case where the robot is a vertical articulated robot having four or more controlled axes, when transfer paths are switched, the combination of the controlled axes being driven changes, and the transfer speed also changes. Therefore, in a case where transfer times for a vertical articulated robot are estimated, accurate transfer time estimation might not be performed unless the characteristics of the control on the vertical articulated robot are considered.

The following is a detailed description of an embodiment of a process plan generation device as a robot transfer time estimation device, with reference to FIG. 1 through FIG. 12.

Figure 1:
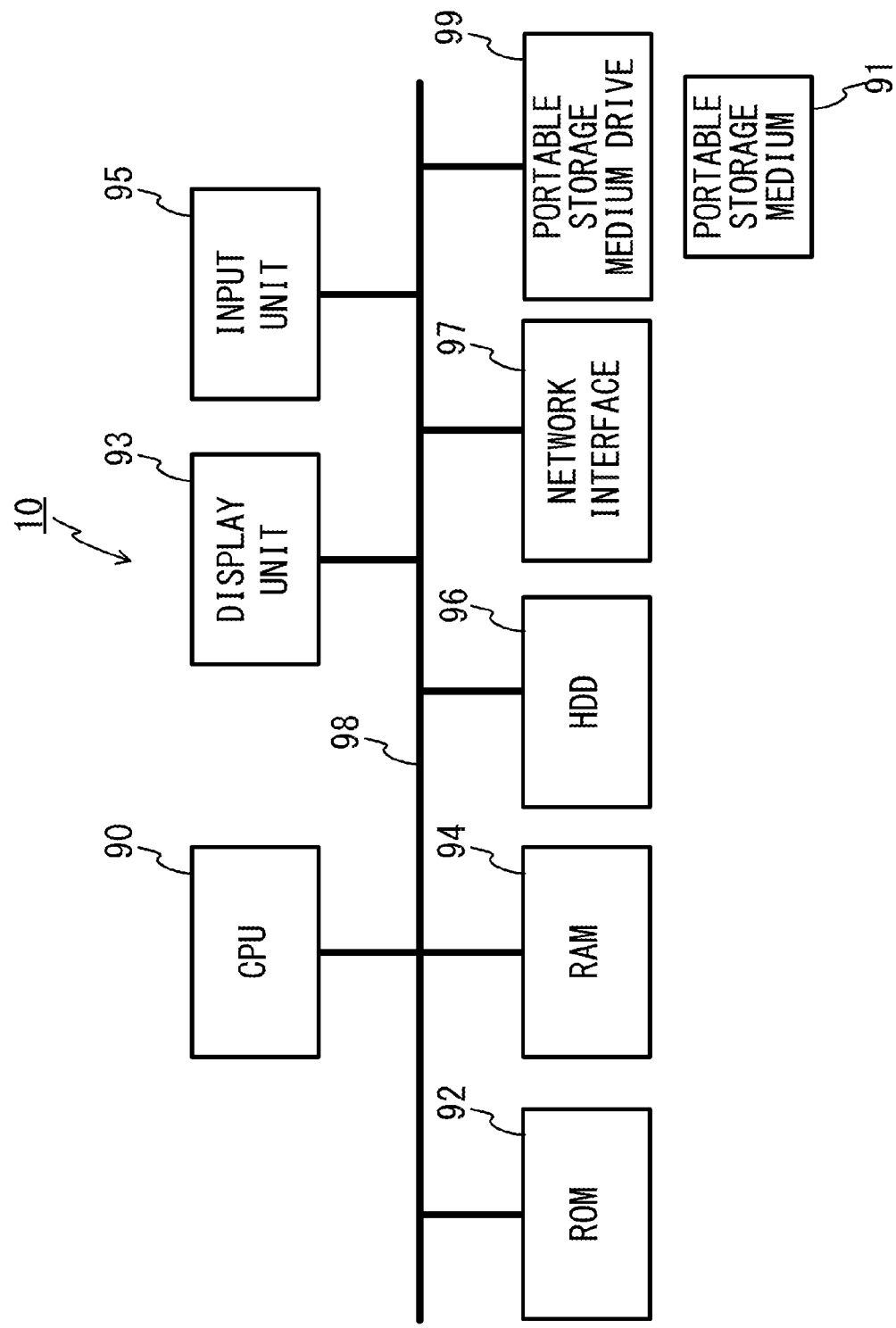
FIG. 1 is a diagram schematically illustrating the hardware configuration of a process plan generation device according to an embodiment.

FIG. 1 illustrates the hardware configuration of a process plan generation device 10 according to the embodiment. The process plan generation device 10 of this embodiment is an information processing device such as a personal computer (PC), and, as illustrated in FIG. 1, includes a central processing unit (CPU) 90, a read only memory (ROM) 92, a random access memory (RAM) 94, a storage unit (a hard disk drive (HDD) in this example) 96, a network interface 97, a portable storage medium drive 99, a display unit 93, an input unit 95, and other components. The display unit 93 includes a liquid crystal display and other components, and the input unit 95 includes a keyboard, a mouse, a touch panel, and the like. The respective components of the process plan generation device 10 are connected to a bus 98.

Figure 4:
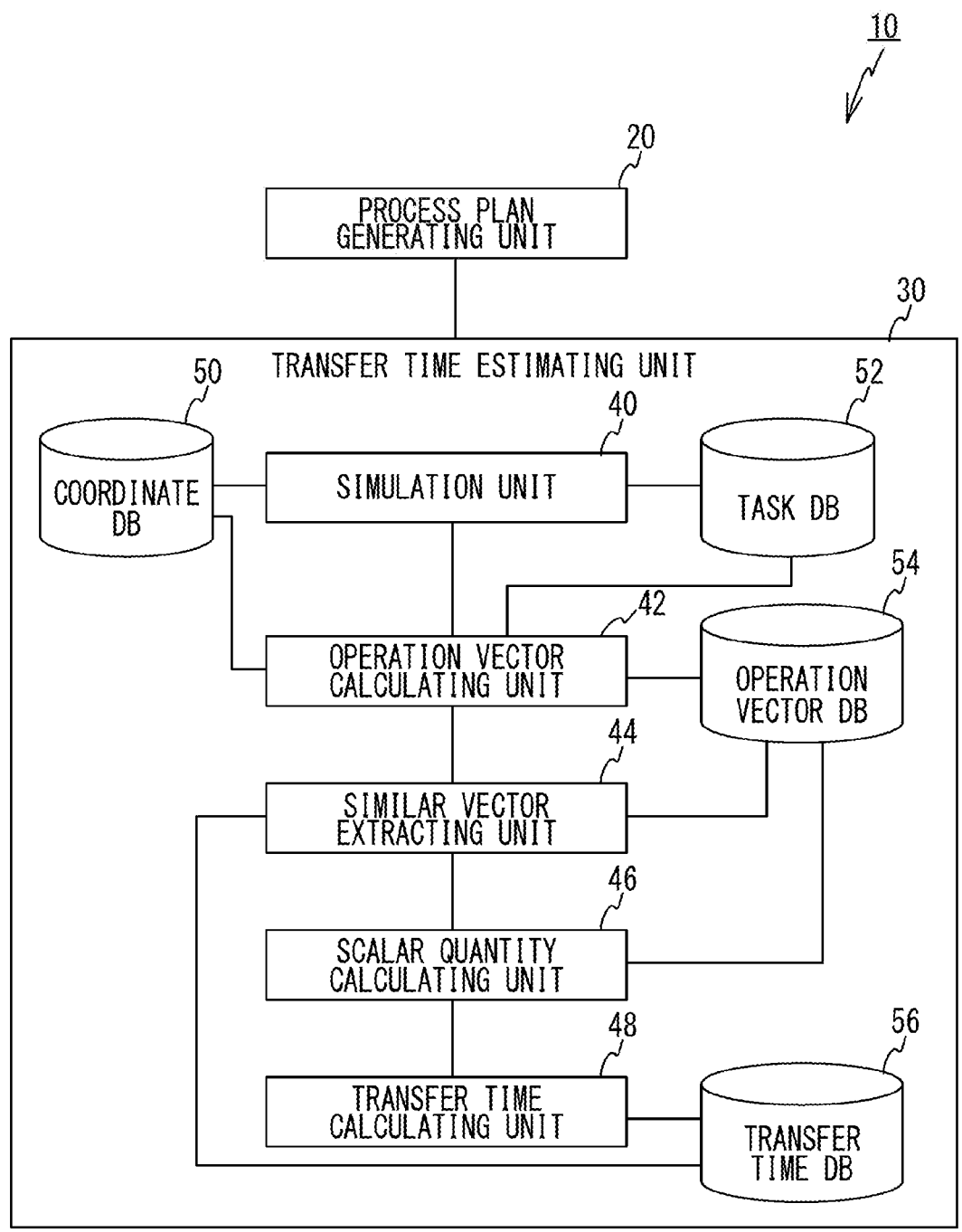
FIG. 4 is a functional block diagram of the process plan generation device.

In the process plan generation device 10, the CPU 90 executes programs (including a robot transfer time estimation program) stored in the ROM 92 or the HDD 96, or programs (including a robot transfer time estimation program) that the portable storage medium drive 99 has read from a portable storage medium 91. In this manner, the functions of the respective components illustrated in FIG. 4 are achieved. FIG. 4 also illustrates a coordinate database (DB) 50, a task DB 52, an operation vector DB 54, and a transfer time DB 56 stored in the HDD 96. The portable storage medium 91 is a portable recording medium such as a CD-ROM, a DVD, or a universal serial bus (USB) memory, or a semiconductor memory such as a flash memory, for example.

Figure 2:
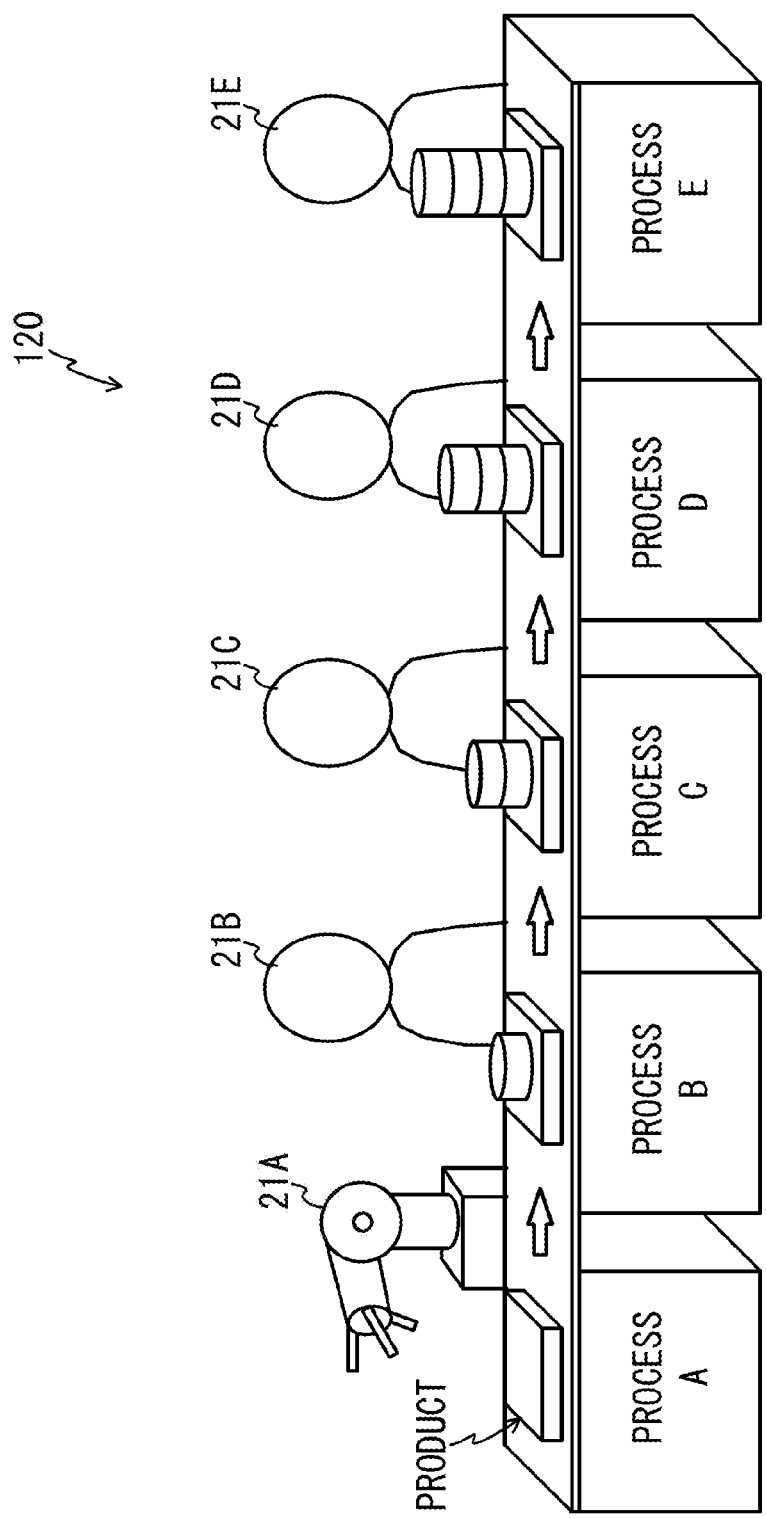
FIG. 2 is a diagram illustrating an example of an assembly line for which a process plan is generated.

The process plan generation device 10 of this embodiment generates a process plan for an assembly line 120 illustrated in FIG. 2. As illustrated in FIG. 2, the assembly line 120 for assembling products has five processes from process A to process E, for example.

The assembly line 120 conveys a product from one process to another with a belt conveyor (not illustrated) or the like. A robot 21A or persons (workers) 21B through 21E are placed for the respective processes on the assembly line 120. In the example illustrated in FIG. 2, the robot 21A is placed for the process A, and the workers 21B through 21E are placed for the processes B through E, respectively. The robot 21A or the workers 21B through 21E placed for the processes A through E manufacture a product by carrying out tasks assigned by the process plan for the product being conveyed on the assembly line 120. In this embodiment, the robot 21A is a vertical articulated robot that has four or more controlled axes.

It should be noted that example configurations of the assembly line 120 are not limited to the example configuration illustrated in FIG. 2. For example, the assembly line 120 may have six or more processes, or may have four or less processes. The robot 21A may be placed for a process other than the process A, and two or more robots may be used.

Figure 3:
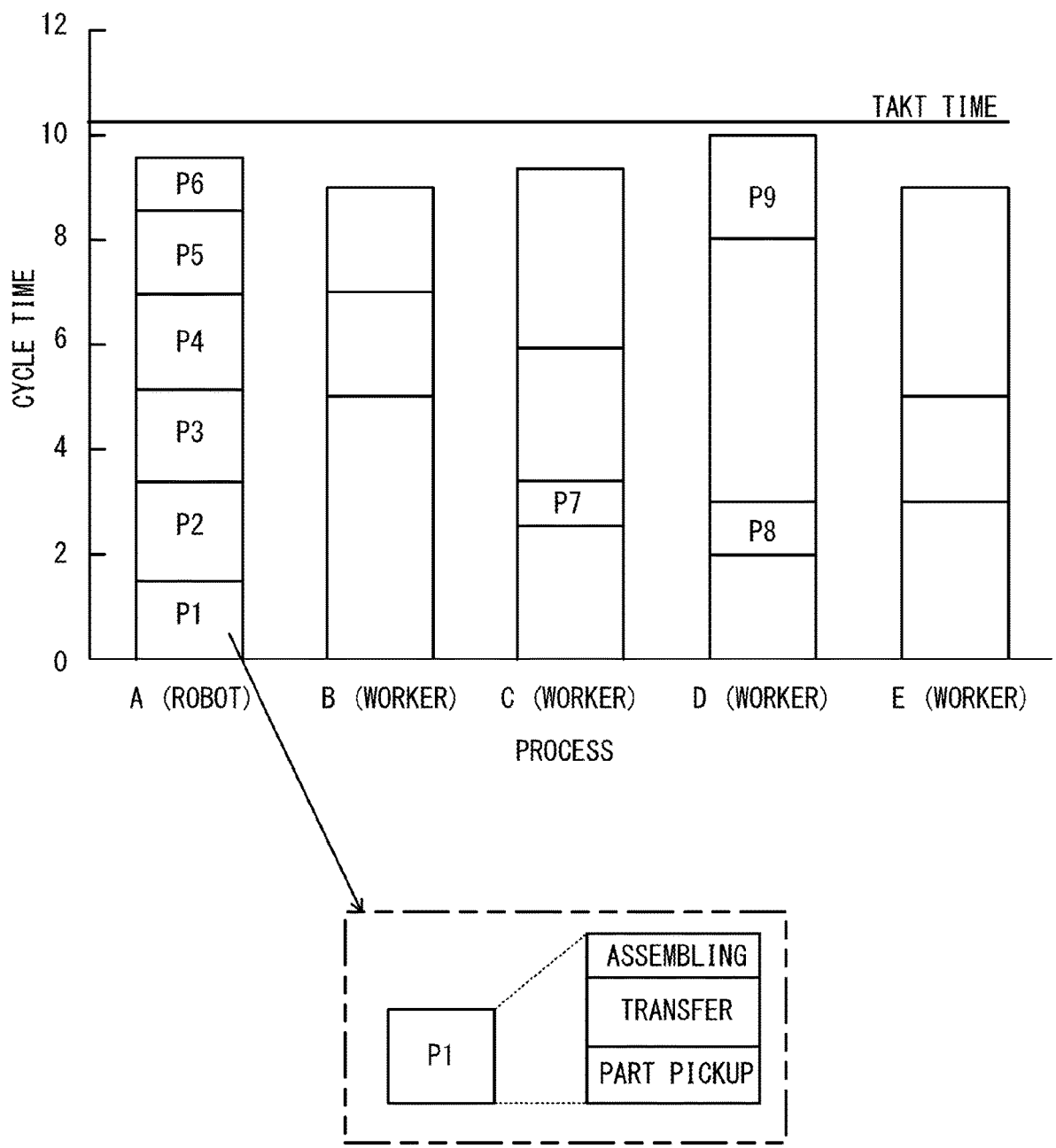
FIG. 3 is a diagram illustrating an example of a process plan that assigns tasks to the five processes illustrated in FIG. 2.

FIG. 3 illustrates an example of the process plan that assigns tasks to the above five processes. In a case where tasks are assigned to processes including a process for which a robot is placed as illustrated in FIG. 3, it is necessary to consider parameters related to workability of the workers and the robot, and parameters such as the takt time. In FIG. 3, P1 through P9 represent the tasks that can be carried out by the robot 21A. In a case where the robot 21A carries out tasks, the time required for each task is divided into a part pickup time, a transfer time, and an assembling time, as illustrated in the frame with a double-dot-and-dash line in FIG. 3. The part pickup time is the time required for the hand of the robot 21A to pick up, at a part supply position, a part to be incorporated into the product. The transfer time is the time required for the hand, which has picked up the part, to transfer the part to the assembling position (a predetermined position in the product). The assembling time is the time required for the hand, which has transferred the part, to incorporate the part into the product. When the process plan is generated, there is the need to calculate (estimate) the times required for the robot to carry out the respective tasks, and consider approximate cycle times of the robot. As the part pickup time and the assembling time illustrated in FIG. 3 are normally known in advance, it is necessary to estimate the transfer time with high accuracy.

FIG. 4 illustrates a functional block diagram of the process plan generation device 10. As the CPU 90 executes programs, the process plan generation device 10 functions as a process plan generating unit 20 and a transfer time estimating unit 30 illustrated in FIG. 4. The process plan generating unit 20 generates a process plan, using a local search technique or the like. The transfer time estimating unit 30 estimates the transfer times of the tasks assigned to the robot 21A. The transfer time estimating unit 30 includes a simulation unit 40, an operation vector calculating unit 42 as an acquiring unit and a calculating unit, a similar vector extracting unit 44 as an identifying unit and a determining unit, a scalar quantity calculating unit 46, and a transfer time calculating unit 48 as an estimating unit.

Figure 5:
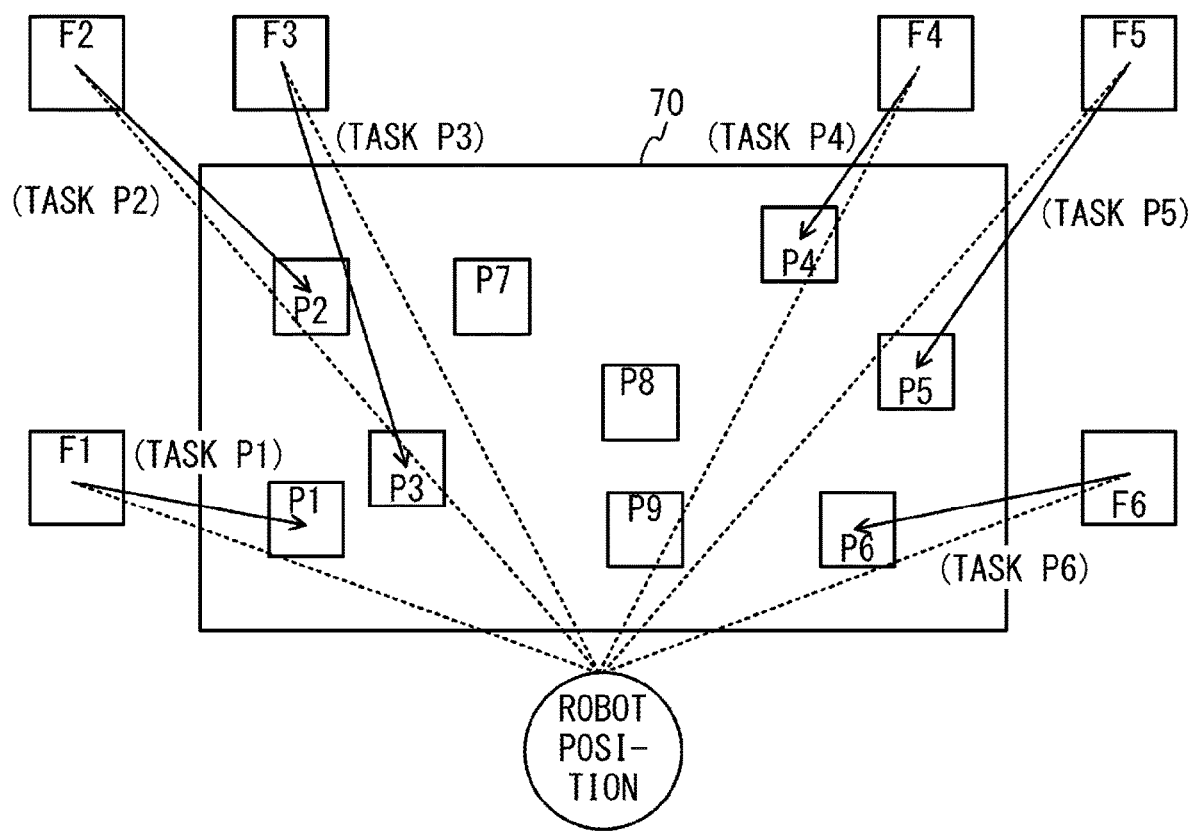
FIG. 5 is a diagram illustrating an overview of each of the tasks assigned to a robot in a process plan.

The simulation unit 40 refers to the first process plan generated by the process plan generating unit 20, and performs a simulation to estimate the transfer times of the tasks assigned to the robot 21A. For example, according to the first process plan, the tasks P1, P2, P3, P4, P5, and P6 are assigned to the robot 21A, as illustrated in FIG. 3. FIG. 5 illustrates an overview of each task. As illustrated in FIG. 5, the task P1 is a task to pick up a part at a part supply position F1, and incorporate the part into a product 70 at an assembling position P1. Likewise, the tasks P2 through P6 are tasks to pick up parts at respective part supply positions F2 through F6, and incorporate the parts into the product 70 at respective assembling positions P2 through P6. The simulation unit 40 refers to the coordinate DB 50, and performs a simulation. By doing so, the simulation unit 40 estimates the times (transfer times) required for the hand of the robot 21A to move along the straight transfer paths indicated by solid arrows in FIG. 5. The simulation unit 40 also stores the simulation results (the results of the transfer time estimation) into the task DB 52.

Here, the coordinate DB 50 has a data structure illustrated in FIG. 6A, for example. Specifically, the coordinate DB 50 stores the coordinates (three-dimensional coordinates) of respective part supply positions and the coordinates (three-dimensional coordinates) of the respective assembling positions.

The task DB 52 has a data structure illustrated in FIG. 6B, for example. As illustrated in FIG. 6B, the task DB has the respective fields of "task ID", "part supply position coordinates", "assembling position coordinates", and "transfer time". The identification information about the respective tasks are stored in the field of "task ID", and the coordinates of the part supply positions corresponding to the respective tasks are stored in the field of "part supply position coordinates". The coordinates of the assembling positions corresponding to the respective tasks are stored in the field of "assembling position coordinates". The transfer times of the respective tasks obtained through a simulation are stored in the field of "transfer time".

Referring back to FIG. 4, the operation vector calculating unit 42 calculates the operation vectors (the vectors indicated by solid arrows in FIG. 5) in a case where the hand linearly moves from the part supply positions to the assembling positions in the respective tasks stored in the task DB 52. The operation vector calculating unit 42 stores the calculated operation vectors into the operation vector DB 54. The operation vector calculating unit 42 also detects a task that is not stored in the task DB 52 (such a task is called an unknown task), and calculates the operation vector in the detected unknown task. That is, the operation vector calculating unit 42 calculates the vector of the path for which a transfer time is to be estimated. In this case, the operation vector calculating unit 42 refers to the coordinate DB 50, and calculates the operation vector in a case where the hand linearly moves from the part supply position to the assembly position in the detected unknown task.

Here, the operation vector DB 54 has a data structure illustrated in FIG. 6C. As illustrated in FIG. 6C, the operation vector DB 54 has the fields of "task ID" and "operation vector". The identification information about the tasks are stored in the field of "task ID", and the operation vectors are stored in the field of "operation vector".

The similar vector extracting unit 44 refers to the operation vector DB 54, and extracts the operation vector most similar to the operation vector of the unknown task. Specifically, the similar vector extracting unit 44 specifies operation vectors one by one from the operation vector DB 54, and calculates the angle between each specified operation vector and the operation vector of the unknown task. In this manner, the similar vector extracting unit 44 identifies the operation vector with the smallest angle among the operation vectors stored in the operation vector DB 54.

The scalar quantity calculating unit 46 calculates the scalar quantity of the operation vector extracted by the similar vector extracting unit 44, and the scalar quantity of the operation vector of the unknown task. In this case, the scalar quantity calculating unit 46 calculates the distance between the part supply position and the assembling position in the task as the scalar quantity of the operation vector.

The transfer time calculating unit 48 calculates the transfer time of the unknown task, in accordance with the results of the calculation performed by the scalar quantity calculating unit 46. Specifically, the transfer time calculating unit 48 calculates the ratio between the scalar quantity of the operation vector extracted by the similar vector extracting unit 44 and the scalar quantity of the operation vector of the unknown task. In accordance with the calculated ratio and the transfer time of the task corresponding to the operation vector extracted by the similar vector extracting unit 44, the transfer time calculating unit 48 calculates the transfer time of the unknown task. The transfer time calculating unit 48 stores the calculated transfer time into the transfer time DB 56.

Here, the transfer time DB 56 is a database that stores the transfer times and the like calculated by the transfer time calculating unit 48, and has a data structure illustrated in FIG. 11. As illustrated in FIG. 11, the transfer time DB 56 has the same data structure as the task DB 52 illustrated in FIG. 6B.

Processing to be Performed by the Transfer Time Estimating Unit 30

Figure 7:
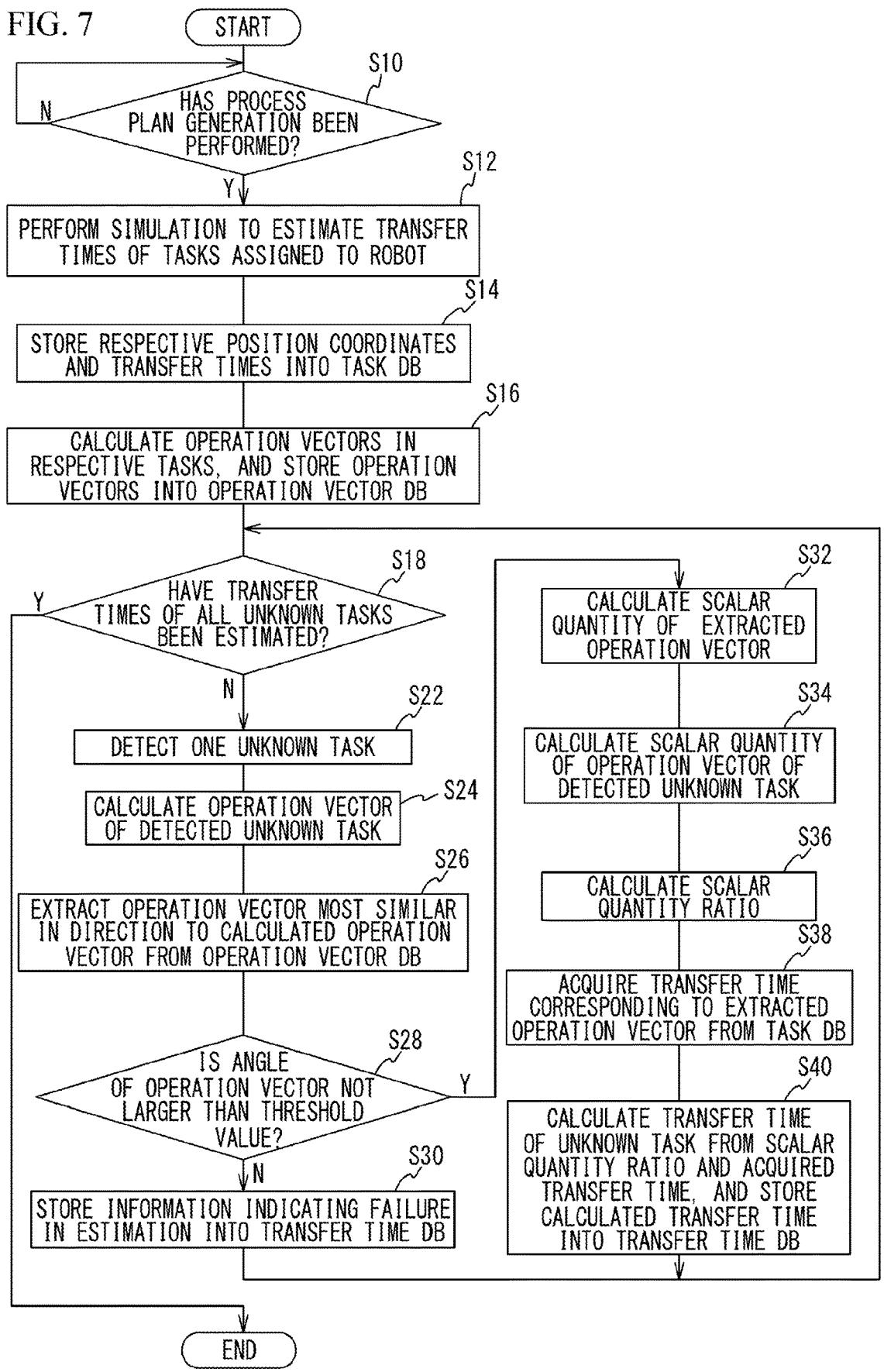
FIG. 7 is a flowchart illustrating the processing to be performed by a transfer time estimating unit.

Next, the processing to be performed by the transfer time estimating unit 30 is described in detail, with reference to the flowchart in FIG. 7, as well as other drawings if necessary. Prior to the processing illustrated in FIG. 7, data based on information about the product to be manufactured and the assembly line is stored in the coordinate DB 50, but no data is stored in the other databases.

When the processing illustrated in FIG. 7 is started, the simulation unit 40 in step S10 first stands by until the first process plan generation is performed by the process plan generating unit 20. In this embodiment, when the process plan generating unit 20 notifies the simulation unit 40 that the process plan illustrated in FIG. 3 has been generated, the processing moves on to step S12.

After the processing moves on to step S12, the simulation unit 40 performs a simulation to estimate the transfer times of the tasks assigned to the robot 21A. In this case, the simulation unit 40 acquires the coordinates of the part supply positions and the assembly positions of the respective tasks from the coordinate DB 50, and performs a simulation to estimate the transfer times of the respective tasks (the transfer times of the transfer paths indicated by the solid arrows in FIG. 5).

In step S14, the simulation unit 40 stores the coordinates of the part supply positions and the assembling positions of the respective tasks, and the transfer times acquired through the simulation, into the task DB 52. FIG. 6B is the task DB 52 after step S14 is carried out.

In step S16, the operation vector calculating unit 42 calculates the operation vectors in the respective tasks (the vectors indicated by the solid arrows in FIG. 5), and stores the operation vectors into the operation vector DB 54. FIG. 6C is the operation vector DB 54 after step S16 is carried out.

In step S18, the operation vector calculating unit 42 determines whether the transfer times of all unknown tasks (tasks not assigned to the robot 21A by the first process plan) have been estimated. Here, the transfer time of any unknown task has not been estimated. Therefore, the result of the determination in step S18 is negative, and the processing moves on to step S22. If the result of the determination in step S18 is positive, the processing illustrated in FIG. 7 is ended.

If the result of the determination in step S18 is negative, the processing moves on to step S22, and the operation vector calculating unit 42 then detects an unknown task. In this case, the operation vector calculating unit 42 detects the task (P7) having the part supply position F1 and the assembly position P7 as an unknown task as indicated by a bold solid arrow in FIG. 8A, for example.

In step S24, the operation vector calculating unit 42 calculates the operation vector of the detected unknown task. In this case, an operation vector F 1P7 is calculated.

Figure 8A:
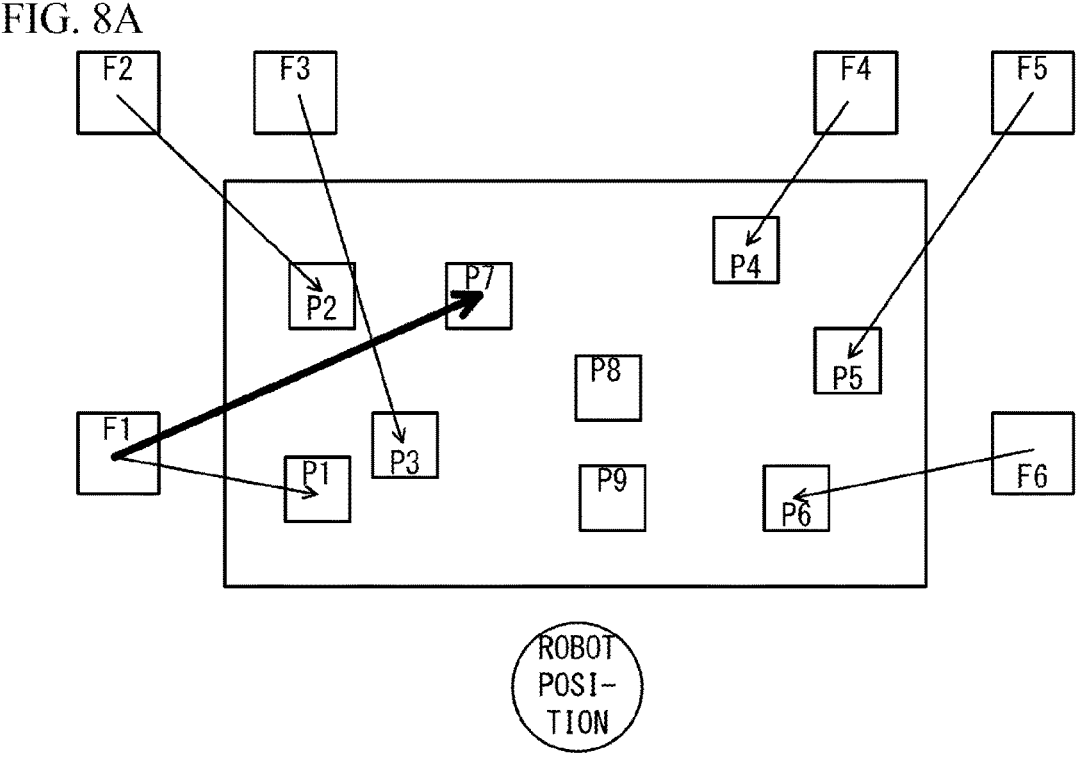
FIG. 8A through FIG. 8D are diagrams for describing transfer time estimation (example 1)
Figure 8B:
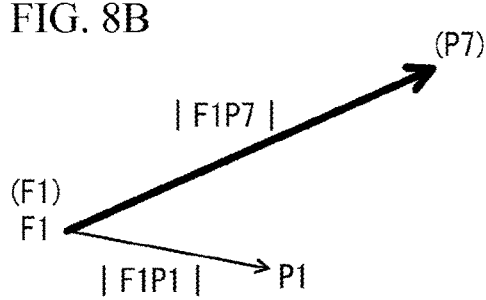
Figure 8C:
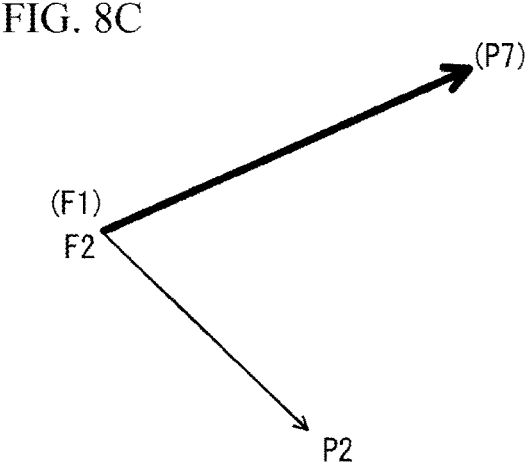
Figure 8D:
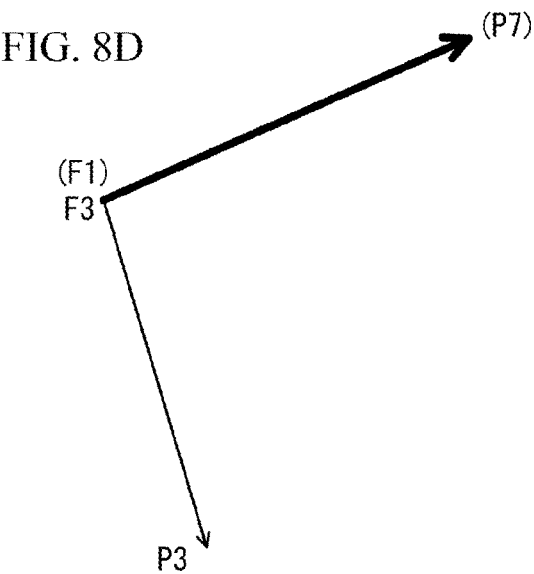

In step S26, the similar vector extracting unit 44 extracts the operation vector most similar to the calculated operation vector from the operation vector DB 54. In this case, the similar vector extracting unit 44 calculates the angle between the operation vector F1P7 and an operation vector F1P1 (see FIG. 8B), the angle between the operation vector F1P7 and an operation vector F2P2 (see FIG. 8C), the angle between the operation vector F1P7 and an operation vector F3P3 (see FIG. 8D), and the others. The similar vector extracting unit 44 then extracts the operation vector with the smallest angle as the operation vector most similar to the calculated operation vector. In the example illustrated in FIG. 8B through FIG. 8D, the operation vector F1P1 in FIG. 8B is extracted.

In step S28, the similar vector extracting unit 44 determines whether the operation vector angle is not larger than a threshold value, i.e., whether the angle is within a predetermined range. In a case where the result of the determination in step S28 is negative, it is highly likely that the transfer time of the unknown task cannot be accurately estimated even if the transfer times acquired through a simulation (FIG. 6B) are used. Therefore, in a case where the result of the determination in step S28 is negative, the processing moves on to step S30, and the similar vector extracting unit 44 stores, into the transfer time DB 56, information indicating that the transfer time of the unknown task (P7) cannot be estimated. It should be noted that, after step S30, the processing returns to step S18, without going through steps S32 through S40. That is, in a case where the result of the determination in step S28 is negative, the later described transfer time estimation (S40) is prohibited.

In a case where the result of the determination in step S28 is positive, on the other hand, the processing moves on to step S32.

As the processing moves on to step S32, the scalar quantity calculating unit 46 calculates the scalar quantity of the operation vector extracted in step S26. In the example illustrated in FIG. 8B, the scalar quantity calculating unit 46 calculates the scalar quantity (|F1P1|) of the operation vector F1P1.

In step S34, the scalar quantity calculating unit 46 calculates the scalar quantity of the operation vector of the unknown task detected in step S22. In the example illustrated in FIG. 8B, the scalar quantity calculating unit 46 calculates the scalar quantity (|F1P7|) of the operation vector F1P7.

In step S36, the transfer time calculating unit 48 calculates the scalar quantity ratio K. In the example illustrated in FIG. 8B, the scalar quantity ratio K1 is calculated as presented in the following expression (1):

$$K1=|F1P7|/|F1P1| \quad (1)$$

In step S38, the transfer time calculating unit 48 acquires the transfer time corresponding to the extracted operation vector. In this case, the transfer time calculating unit 48 acquires the transfer time T1 corresponding to the operation vector F1P1 (task P1), from the task DB 52 illustrated in FIG. 6B.

In step S40, from the scalar quantity ratio and the acquired transfer time, the transfer time calculating unit 48 calculates the transfer time of the unknown task, and stores the transfer time into the transfer time DB 56. In the above example, the transfer time calculating unit 48 calculates the transfer time T7a of the unknown task, according to the expression (2) presented below.

$$T7a=K1 \times T1 \quad (2)$$

In the transfer time DB 56 illustrated in FIG. 11, the result of the above processing (T7a=K1×T1) is stored as the first record from the top.

After the processing in step S40 is completed, the processing returns to step S18, and the processing in steps S18 through S40 are repeatedly performed until the result of the determination in step S18 becomes negative.

For example, a task P7 having the part supply position F2 and the assembly position P7 as indicated by a bold solid arrow in FIG. 9A is selected as an unknown task (S22). In this case, the similar vector extracting unit 44 in step S26 calculates the angle between the operation vector F2P7 and the operation vector F1P1 (see FIG. 9B), the angle between the operation vector F2P7 and the operation vector F2P2 (see FIG. 9C), the angle between the operation vector F2P7 and the operation vector F3P3 (see FIG. 9D), and the others. The similar vector extracting unit 44 then extracts the operation vector with the smallest angle as the operation vector most similar to the calculated operation vector. In the example illustrated in FIG. 9B through FIG. 9D, the operation vector F2P2 in FIG. 9C is extracted.

Thus, the transfer time calculating unit 48 calculates a scalar quantity ratio K2, according to the expression (3) presented below. Using the calculated ratio K2 and the transfer time T2 corresponding to the operation vector F2P2, the transfer time calculating unit 48 calculates the transfer time T7b of the unknown task, according to the expression (4) presented below.

$$K2=|F2P7|/|F2P2| \quad (3)$$

$$T7a=K2 \times T2 \quad (4)$$

It should be noted that, in the transfer time DB 56 illustrated in FIG. 11, the result of the above processing (T7b=K2×T2) is stored as the second record from the top.

Figure 10A:
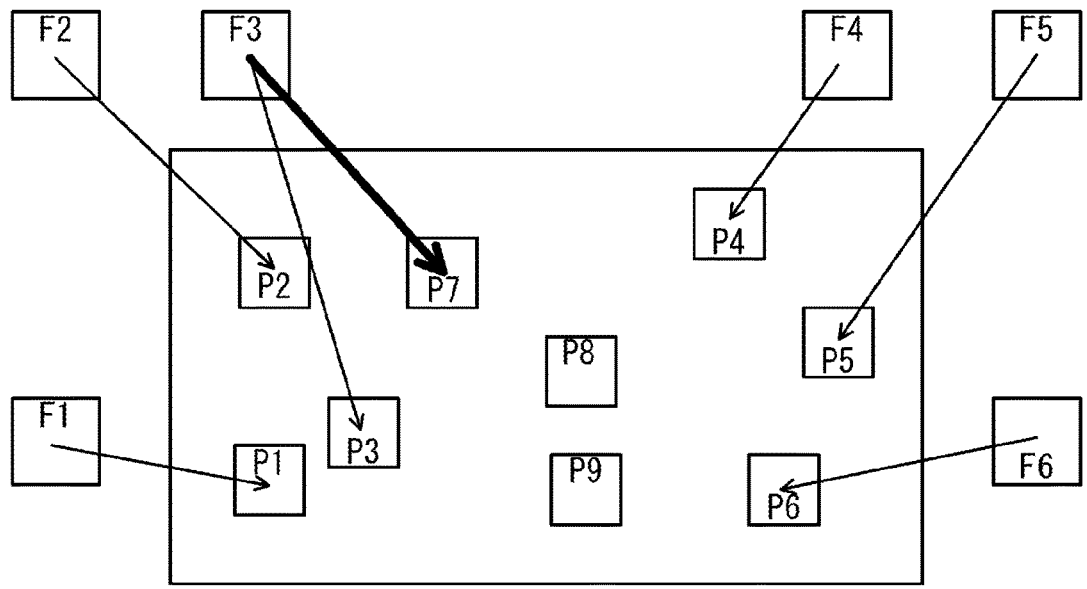
FIG. 10A through FIG. 10D are diagrams for describing transfer time estimation (example 3)
Figure 10B:
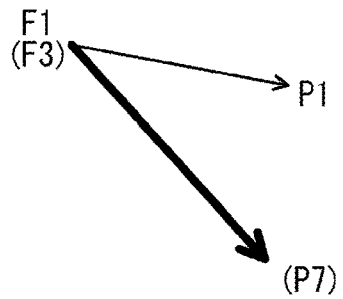
Figure 10C:
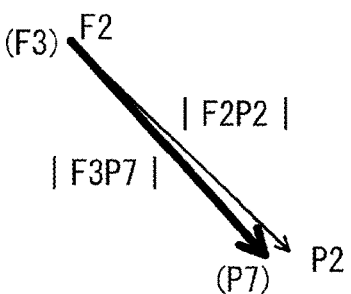
Figure 10D:
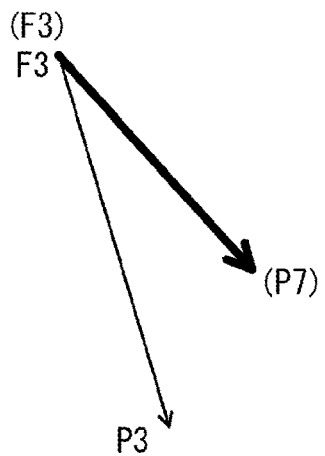

In another example, a task P7 having the part supply position F3 and the assembly position P7 as indicated by a bold solid arrow in FIG. 10A is selected as an unknown task (S22). In this case, the similar vector extracting unit 44 in step S26 calculates the angle between the operation vector F3P7 and the operation vector F1P1 (see FIG. 10B), the angle between the operation vector F3P7 and the operation vector F2P2 (see FIG. 10C), the angle between the operation vector F3P7 and the operation vector F3P3 (see FIG. 10D), and the others. The similar vector extracting unit 44 then extracts the operation vector with the smallest angle as the operation vector most similar to the calculated operation vector. In the example illustrated in FIG. 10B through FIG. 10D, the operation vector F2P2 in FIG. 10C is extracted.

Thus, the transfer time calculating unit 48 calculates a scalar quantity ratio K3, according to the expression (5) presented below. Using the calculated ratio K3 and the transfer time T2 corresponding to the operation vector F2P2, the transfer time calculating unit 48 calculates the transfer time T7c of the unknown task, according to the expression (6) presented below.

$$K3=|F3P7|/|F2P2| \quad (5)$$

$$T7c=K3 \times T2 \quad (6)$$

It should be noted that, in the transfer time DB 56 illustrated in FIG. 11, the result of the above processing (T7c=K3×T2) is stored as the third record from the top.

As described above, in a case where the transfer time of an unknown task is estimated in the processing illustrated in FIG. 7, the scalar quantity and the transfer time of the operation vector of the task most similar in the transfer direction to the unknown task are used. In this manner, the transfer time of an unknown task can be estimated by using an operation vector as or to which the controlled axis of the hand of a vertical articulated robot being driven is the same or similar. Thus, it becomes possible to estimate the transfer time of an unknown task with high accuracy, taking into account the controlled axis of the hand that is moving.

Figure 12:
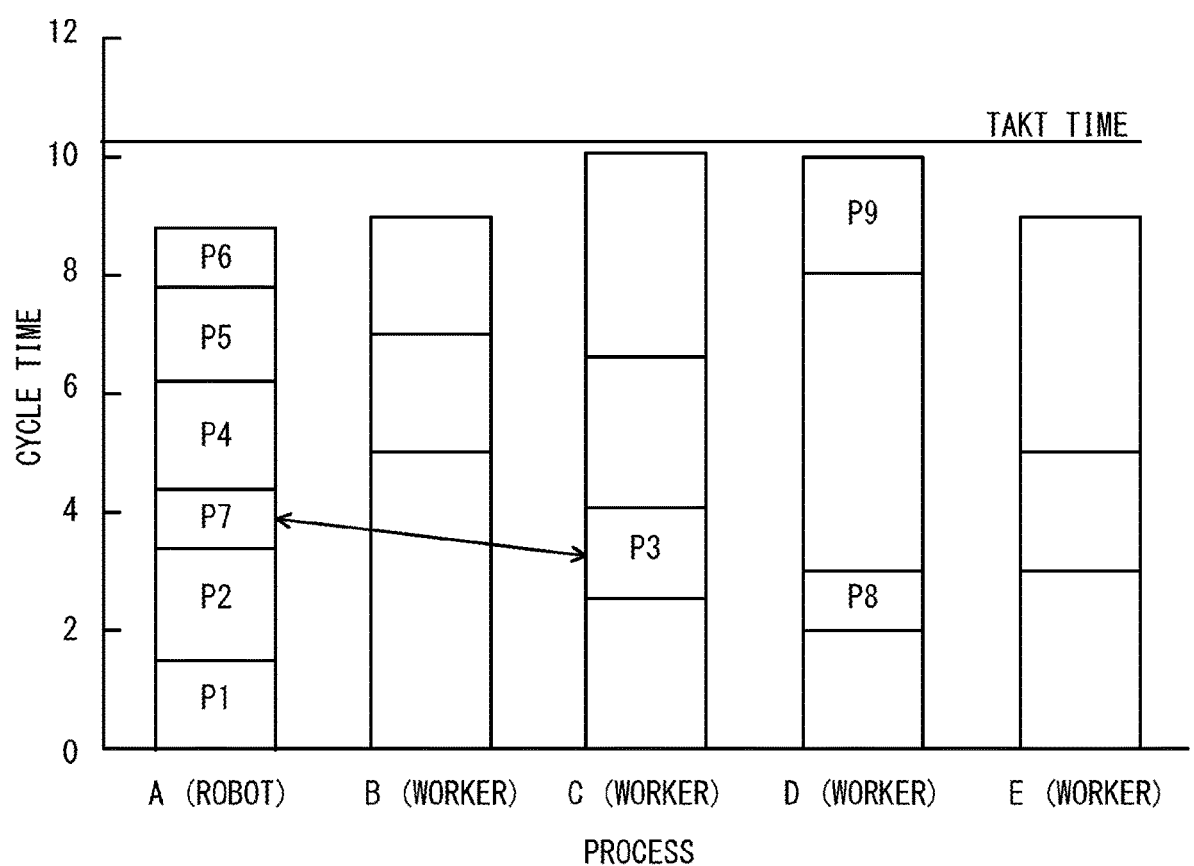
FIG. 12 is a diagram illustrating an example of a regenerated process plan.

In this embodiment, the process plan generating unit 20 may again generate a process plan after generating the first process plan. For example, in regeneration of a process plan, the task P3 and the task P7 in the first process plan (FIG. 3) are switched as illustrated in FIG. 12. The task P7 in this case is a task having the part supply position F3 and the assembling position P7. In such a case, the process plan generating unit 20 should acquire the transfer time stored in the third record from the top in the transfer time DB 56 illustrated in FIG. 11, as the transfer time of the task P7. In this manner, the task time of the task P7 can be accurately estimated without a simulation.

As for the task for which the information indicating that the transfer time cannot be estimated is stored into the transfer time DB 56 in step S30 in FIG. 7, the simulation unit 40 should determine the transfer time by performing a simulation to estimate the transfer time, for example.

As described above in detail, according to this embodiment, the operation vector calculating unit 42 acquires the results of a transfer time simulation in a case where the hand of the robot 21A moves along each of the straight transfer paths. The operation vector calculating unit 42 then calculates the respective operation vectors, and stores the calculated operation vectors into the operation vector DB 54 (S16). The similar vector extracting unit 44 compares the direction of the operation vector of an unknown task with those of the operation vectors stored in the operation vector DB 54, and identifies the operation vector most similar to the operation vector of the unknown task (S26). The transfer time calculating unit 48 then estimates the transfer time of the unknown task, in accordance with the scalar quantity of the identified operation vector, the scalar quantity of the operation vector of the unknown task, and the transfer time corresponding to the identified operation vector (S40). That is, in this embodiment, in a case where the transfer time of an unknown task is estimated by using transfer times acquired through a simulation, the operation vector most similar in direction to the operation vector of the unknown task, and the transfer time corresponding to the most similar operation vector are extracted from the operation vector DB 54 and the task DB 52, and are used in the estimation. Thus, the transfer time of an unknown task can be accurately estimated, as the transfer time of the unknown task is estimated in accordance with an operation vector as or to which the controlled axis of the hand of a vertical articulated robot being driven is the same or similar.

Also, in this embodiment, in a case where the angle between the operation vector of an unknown task and the operation vector most similar to the operation vector of the unknown task is neither equal to nor smaller than a threshold value, the operation vector of the unknown task is not estimated (estimation is prohibited). With this, low-accuracy transfer time estimation can be prohibited.

Further, in this embodiment, the transfer time calculating unit 48 in step S40 calculates the product of the ratio between the scalar quantity of the operation vector of an unknown task and the scalar quantity of the operation vector extracted in step S26, and the transfer time corresponding to the extracted operation vector. The product is calculated as the transfer time of the unknown task. Thus, the transfer time of an unknown task can be calculated through an easy arithmetic operation.

First Variation

In the example described in the above embodiment, the transfer time estimating unit 30 estimates the transfer times of all unknown tasks after the first process plan is generated. However, the present invention is not limited to the example. Specifically, the transfer time estimating unit 30 may estimate only the transfer times of the tasks assigned to the robot 21A in a case where the process plan generating unit 20 again generates a process plan.

Figure 13:
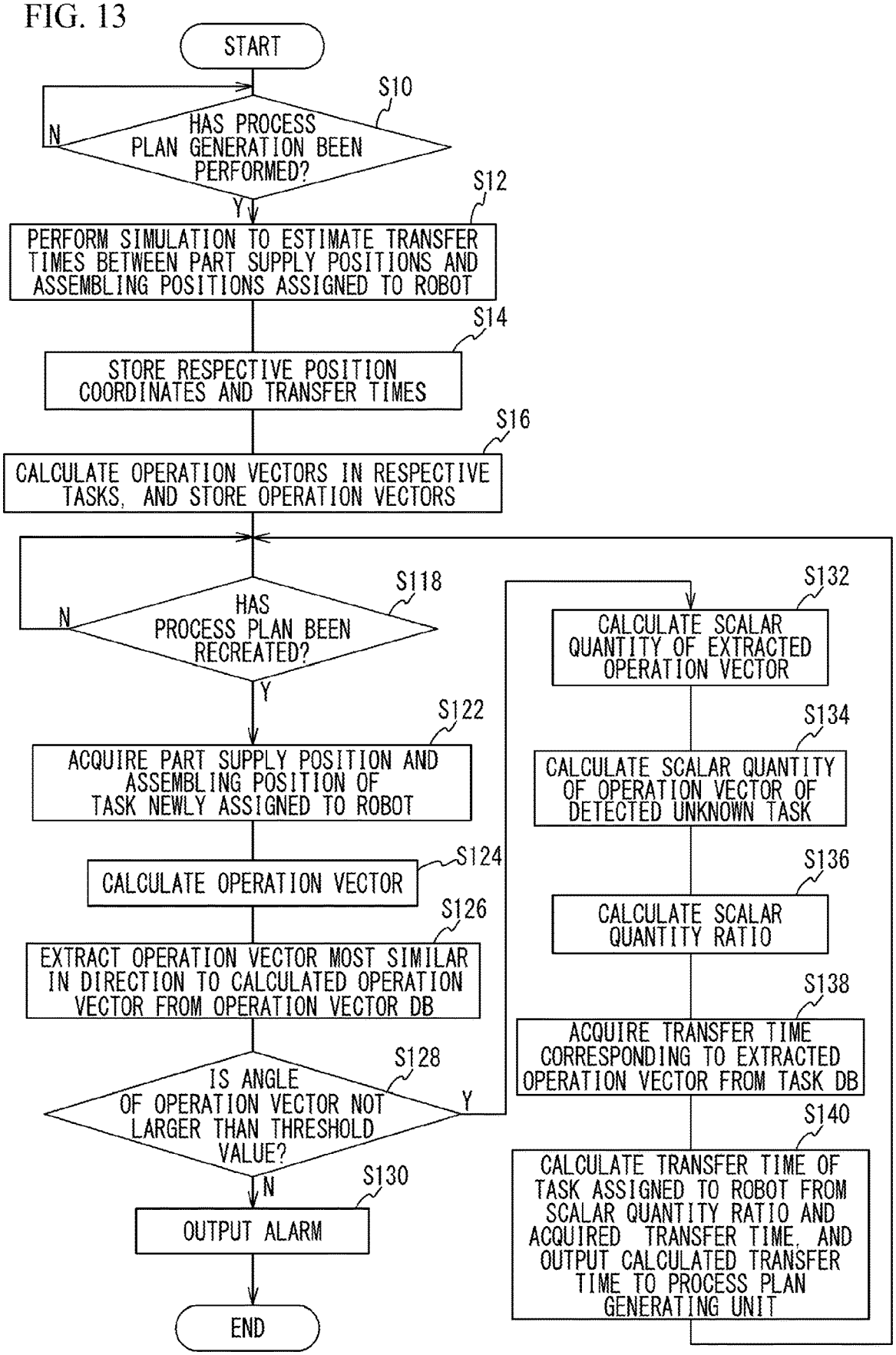
FIG. 13 is a flowchart illustrating the processing to be performed by a transfer time estimating unit according to a first variation.

FIG. 13 is a flowchart illustrating the processing to be performed by the transfer time estimating unit 30 in the first variation. In the processing illustrated in FIG. 13, steps 10 through S16 are carried out in the same manner as in the above embodiment.

After step S16, the processing moves on to step S118, and the operation vector calculating unit 42 stands by until the process plan generating unit 20 recreates a process plan. Upon receipt of a notification of the recreation of a process plan from the process plan generating unit 20, the operation vector calculating unit 42 in step S122 acquires the part supply position and the assembling position of the task newly assigned to the robot 21A. In step S124, the operation vector calculating unit 42 calculates the operation vector.

In step S126, the similar vector extracting unit 44 extracts the operation vector most similar in direction to the calculated operation vector from the operation vector DB 54. In step S128, the similar vector extracting unit 44 determines whether the angle between the operation vector calculated in step S124 and the operation vector extracted in step S126 is not larger than a threshold value.

In a case where the result of the determination in step S128 is negative, the processing moves on to step S130, and the similar vector extracting unit 44 outputs an alarm. In a case where an alarm is output in step S130, the simulation unit 40 may acquire the transfer time of the task newly assigned to the robot through a simulation, for example. As an alarm is output in step S130, the user (the process planner) can recognize that the simulation has been performed.

In a case where the result of the determination in step S128 is positive, the processing moves on to step S132, and the processing in steps S132 through S138 is performed in the same manner as in steps S32 through S38 illustrated in FIG. 7. After that, the processing moves on to step S140, and the transfer time calculating unit 49 calculates the transfer time of the task newly assigned to the robot, from the scalar quantity ratio calculated in step S136 and the transfer time acquired in step S138. The transfer time calculating unit 48 outputs the calculated transfer time to the process plan generating unit 20. After that, the processing returns to step S118.

As described above, in the first variation, the transfer time of the task newly assigned to the robot is calculated (estimated) every time a process plan is regenerated. Thus, the processing load on the transfer time estimating unit 30 can be reduced.

Second Variation

In the examples described in the above embodiment and the first variation, the simulation unit 40 in step S12 performs a simulation to estimate the transfer times of the tasks assigned to the robot 21A by the first process plan. However, the present invention is not limited to those examples. For example, in a situation where the robot 21A is being actually operated, the robot 21A may be moved along a transfer path, and the time required for the transfer (the actual transfer time) may be measured.

Figure 14:
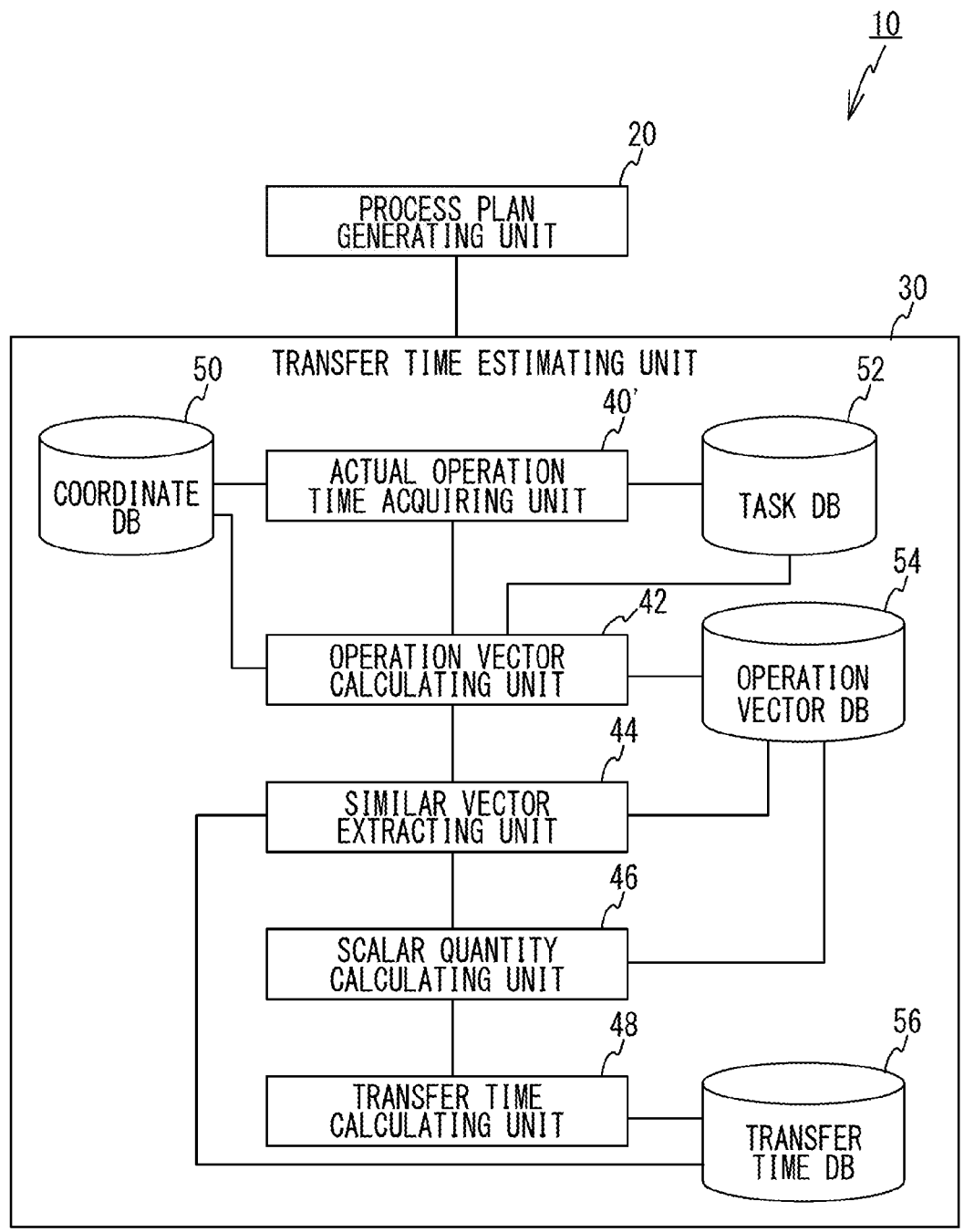
FIG. 14 is a functional block diagram of a process plan generation device according to a second variation.

For example, as illustrated in FIG. 14, the simulation unit 40 illustrated in FIG. 4 is replaced with an actual operation time acquiring unit 40' prepared as a function of the transfer time estimating unit 30. In this case, the actual operation time acquiring unit 40' carries out step S12' illustrated in FIG. 15, instead of step S12 illustrated in FIG. 7. Specifically, the actual operation time acquiring unit 40' in step S12' outputs an instruction to a worker (by displaying the instruction on the display unit 93 or the like), to cause the worker to measure the transfer times (actual transfer times) of the tasks assigned to the robot 21A by the first process plan. The worker, who has checked the instruction, moves the robot 21A along the transfer paths by inputting operation commands or the like to the robot 21A (or more specifically, to the controller of the robot 21A), and measures the actual transfer times with a stopwatch. The worker then inputs the measurement results (the actual transfer times) through the input unit 95. In this manner, the actual operation time acquiring unit 40' can acquire the actual transfer times of the tasks assigned to the robot 21A by the first process plan, and stores the actual transfer times into the field of "transfer time" in the task DB 52.

As described above, according to the second variation, the transfer time estimating unit 30 estimates the transfer time of an unknown task, in accordance with the transfer times (actual transfer times) required for the hand of the robot 21A to actually move along the respective straight transfer paths. Thus, the transfer time of an unknown task can be accurately estimated.

Figure 15:
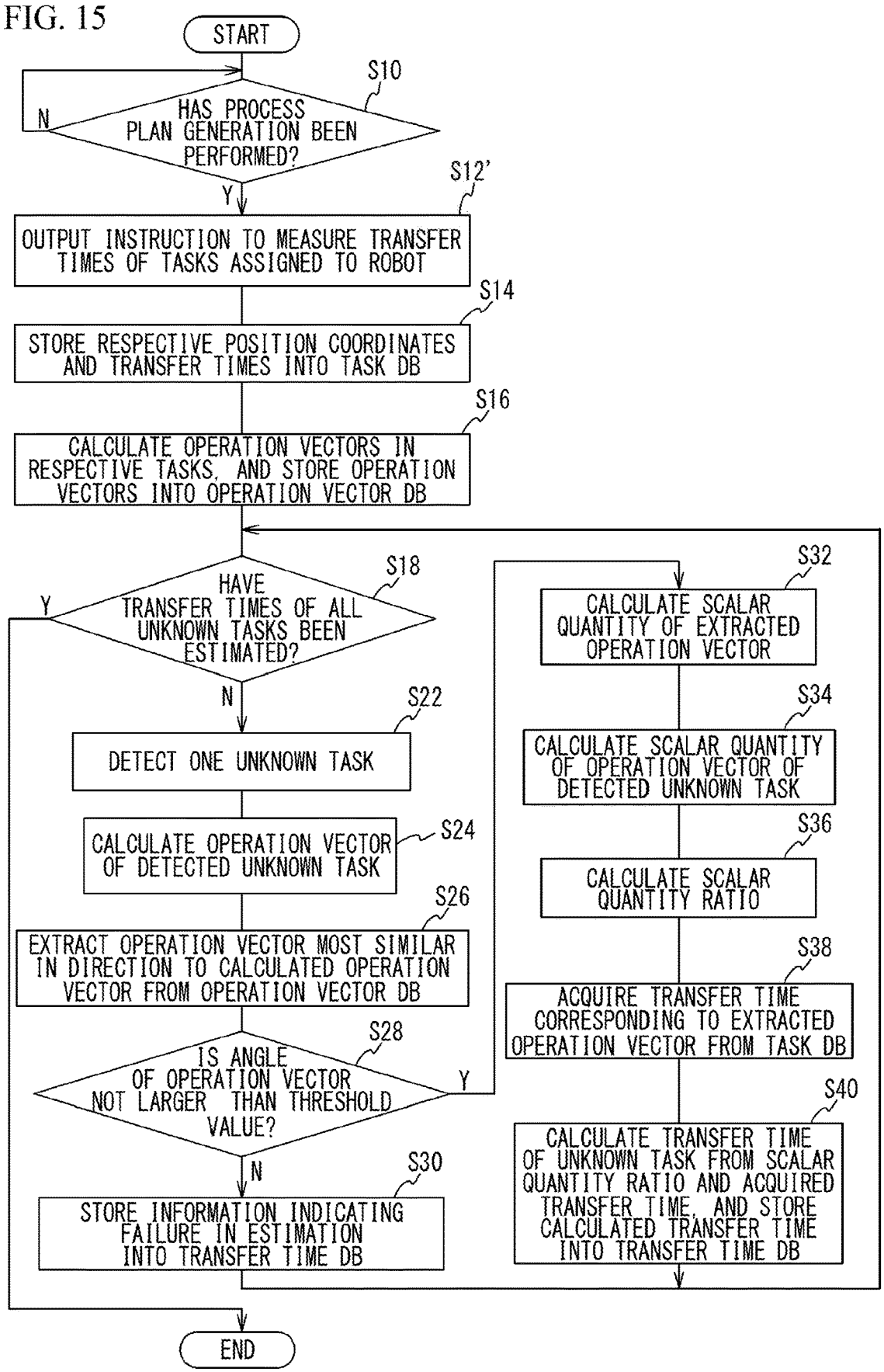
FIG. 15 is a flowchart illustrating the processing to be performed by a transfer time estimating unit according to the second variation.

Although FIG. 15 illustrates an example in which step S12' is carried out instead of step S12 illustrated in FIG. 7, the present invention is not limited to this example, and step S12' may be carried out instead of step S12 in the processing of the first variation (the processing illustrated in FIG. 13).

In a case where an actual transfer time is measured, a video image of the robot 21A being moved is captured, and the actual transfer time may be measured in accordance with the time during which the movement of the robot 21A is captured. An actual transfer time may be measured with a means other than a stopwatch or video imaging.

Further, the actual operation time acquiring unit 40' illustrated in FIG. 14 may generate operation commands for carrying out the tasks assigned to the robot 21A by the first process plan, in accordance with the coordinate DB 50, and input the operation commands to the robot 21A (controller). At the same time, the actual operation time acquiring unit 40' may input an instruction to cause the robot 21A to output operation start times and operation end times. In this manner, the actual operation time acquiring unit 40' can acquire, from the robot 21A, the operation start times and the operation end times of actual execution of the tasks assigned to the robot 21A. Thus, actual operation times can be calculated in accordance with those acquired times.

The above-described processing functions are implemented by a computer. In this case, a program in which processing details of the functions that a processing device (CPU) is to have are written are provided. The execution of the program by the computer allows the computer to implement the above described processing functions. The program in which the processing details are written can be stored in a storage medium (however, excluding carrier waves) capable of being read by a computer.

When the program is distributed, it may be sold in the form of a portable storage medium such as a DVD (Digital Versatile Disc) or a CD-ROM (Compact Disc Read Only Memory) storing the program. The program may be stored in a storage device of a server computer, and the program may be transferred from the server computer to another computer over a network.

A computer executing the program stores the program stored in a portable storage medium or transferred from a server computer in its own storage device. The computer then reads the program from its own storage device, and executes a process according to the program. The computer may directly read the program from a portable storage medium, and execute a process according to the program. Alternatively, the computer may successively execute a process, every time the program is transferred from a server computer, according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable storage medium storing a robot transfer time estimation program for causing a computer to execute a process, the process comprising:
   acquiring transfer times of a plurality of straight transfer paths for a hand of a vertical articulated robot having at least four controlled axes;
   calculating a vector of each of the plurality of straight transfer paths;
   comparing a direction of a vector of a target path for which a transfer time is to be estimated with a direction of the vector of each of the plurality of straight transfer paths, and identifying, among the plurality of straight transfer paths, a transfer path most similar in vector direction to the target path; and
   estimating a transfer time of the target path, in accordance with a scalar quantity of a vector of an identified transfer path, a scalar quantity of the vector of the target path, and a transfer time of the identified transfer path.

2. The non-transitory computer-readable storage medium of claim 1, wherein the process further comprises:
   determining whether an angle between the vector of the identified transfer path and the vector of the target path is within a predetermined range; and,
   when the angle is determined not to be within the predetermined range, prohibiting execution of the estimating.

3. The non-transitory computer-readable storage medium of claim 1, wherein the estimating includes calculating a product of a result acquired by dividing the scalar quantity of the vector of the target path by the scalar quantity of the vector of the identified transfer path and the transfer time of the identified transfer path.

4. A robot transfer time estimation method implemented by a computer, the robot transfer time estimation method comprising:
   acquiring transfer times of a plurality of straight transfer paths for a hand of a vertical articulated robot having at least four controlled axes;
   calculating a vector of each of the plurality of straight transfer paths;
   comparing a direction of a vector of a target path for which a transfer time is to be estimated with a direction of the vector of each of the plurality of straight transfer paths, and identifying, among the plurality of straight transfer paths, a transfer path most similar in vector direction to the target path; and
   estimating a transfer time of the target path, in accordance with a scalar quantity of a vector of an identified transfer path, a scalar quantity of the vector of the target path, and a transfer time of the identified transfer path.

5. A robot transfer time estimation device comprising:
   a memory; and
   a processor coupled to the memory and configured to:
   acquire transfer times of a plurality of straight transfer paths for a hand of a vertical articulated robot having at least four controlled axes;
   calculate a vector of each of the plurality of straight transfer paths;
   compare a direction of a vector of a target path for which a transfer time is to be estimated with a direction of the vector of each of the plurality of straight transfer paths, and identify, among the plurality of straight transfer paths, a transfer path most similar in vector direction to the target path; and
   estimate a transfer time of the target path, in accordance with a scalar quantity of a vector of an identified transfer path, a scalar quantity of the vector of the target path, and a transfer time of the identified transfer path.

6. The robot transfer time estimation device of claim 5, wherein the processor is configured to:
   determine whether an angle between the vector of the identified transfer path and the vector of the target path is within a predetermined range, and wherein, when the angle is determined not to be within the predetermined range, the processor is configured not to perform estimation.

7. The robot transfer time estimation device of claim 5, wherein the processor is configured to calculate a product of a result acquired by dividing the scalar quantity of the vector of the target path by the scalar quantity of the vector of the identified transfer path, and the transfer time of the identified transfer path.

\* \* \* \* \*